Nov. 2, 1937.  G. S. McLAY  2,098,153
PUSH BENCH METHOD AND APPARATUS
Filed Sept. 25, 1935
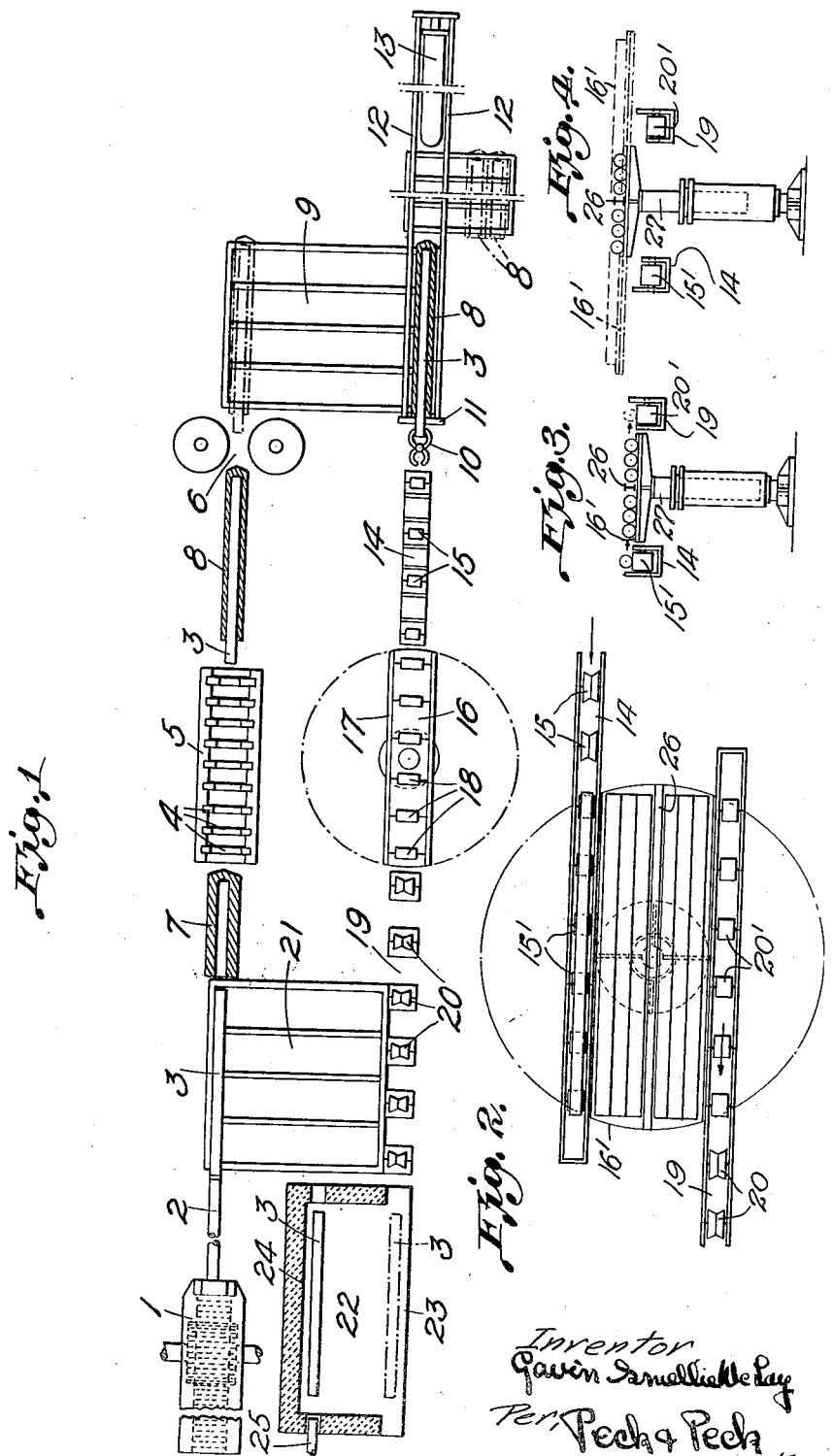

Patented Nov. 2, 1937

2,098,153

UNITED STATES PATENT OFFICE 2,098,153

PUSH BENCH METHOD AND APPARATUS

Gavin Smellie McLay, London, England, assignor, by mesne assignments, to Stewarts and Lloyds, Limited, Glasgow, Scotland, a company of Great Britain Application September 25, 1935, Serial No. 42,103
In Great Britain November 15, 1934

2 Claims. (Cl. 205—4)

This invention relates to a method of and apparatus for the manufacture of metal tubes and other tubular metal articles.

The apparatus is of the push bench type by which a somewhat thick cup-shaped hollow billet carried on an end of a mandrel is pushed through dies or through passes between rolls which decrease successively in cross-sectional area in the forward direction, whereby the billet is reduced in thickness and spread out lengthwise along the mandrel until the billet is brought to or approximately to the form of a tube of the required thickness and length. An example of such apparatus is described in the specification of British Letters Patent No. 300,288.

In the usual method of operation of such apparatus the mandrel is removed from the apparatus, the tube stripped therefrom and the mandrel returned to the apparatus for use in the production of a further tube. It is found that the mandrel becomes non-uniformly heated which causes changes in the condition of its metal and shape resulting in uneven wear of the mandrel and lack of uniformity in successive tubes produced. It is an object of the present invention to overcome these difficulties.

Referring to the accompanying drawing forming a part hereof, Fig. 1 is a diagrammatic plan of the general layout of an embodiment of the apparatus, by way of example.

Fig. 2 is a plan view of a modification turntable arrangement and adjacent parts.

Fig. 3 is an end elevation of the disclosure of Fig. 2, and

Fig. 4 is an end elevation of said disclosure in another position.

The plant comprises a push bench apparatus having a driving rack 1, a mandrel carrier 2, a mandrel 3 and dies 4 which decrease successively in cross-sectional area and which are mounted in a ring bed 5, and, if desired, a reeling mill 6 of a known form arranged in line. 7 is the hollow billet and 8 is the tube formed on the mandrel 3. After the mandrel with the tube formed on it has passed through the reeling mill, by which the tube is loosened on the mandrel, it is delivered to a skid table indicated at 9 across which it passes to stripping apparatus where the tube is removed from the mandrel. The stripping apparatus may be of any known and convenient form and in the present case comprises a pair of gripping jaws 10 which engage the mandrel and hold it while a slotted plate 11 placed at the back of the tube 8 and attached by rods 12 to hydraulic apparatus 13 is drawn back by the latter to remove the tube from the mandrel. From the grippers 10 the mandrel is delivered to a roller conveyor table 14 which comprises a series of driven rollers 15 and is arranged in line with a turntable 16. The roller conveyor table 14 delivers the mandrels to said turntable.

The turntable 16 is of any desired form but conveniently consists of a long frame structure 17 of sufficient width to receive a desired number of mandrels, for example three. It carries on its underside rollers which run on a circular path carried on a frame so that it may easily be rotated by any usual driving mechanism. The frame structure 17 is associated with driven rollers 18 to assist in delivering the mandrels to it. The turntable may be operated manually or may be power driven. The turntable 16 is also in line with a second roller conveyor table 19 consisting of a series of driven rollers 20. The mandrels which have been turned round end for end by the roller conveyor turntable 16 are delivered by the roller conveyor table 19 to a point opposite to a skid table 21 by which they may be delivered as required to the push bench apparatus.

The roller table 19 is disposed opposite to a furnace 22 into which the mandrels may be fed by said roller table. Said furnace has a sloping floor so that the mandrels delivered to it travel across it from one side 23 to the other 24. It is provided at the discharge side with a pusher rod 25 to push the mandrel from the furnace and deliver it to the skid table 21 by which it is delivered to the push bench apparatus. Treating the mandrels in the furnace 22 assists in restoring the condition of the metal which may have changed during the operation of the push bench apparatus due to uneven heating.

It will be understood that various modifications can be made without departing from the invention, for example, the turntable may be arranged to operate in a vertical plane.

Referring to the modification illustrated by Figs. 2 through 4, it will be noted that the turntable 16' is divided longitudinally at 26. Mandrels are fed to one side of this turntable by the rollers 15, 15', of the conveyor 14, at the same time that mandrels are being carried away from the divided turntable by the rollers 20', 20, of the conveyor 19. The mandrels are reversed by the divided turntable in groups or batches of several together and so that they are returned to the push-bench apparatus at the same rate that they are received from it. Fig. 3 shows the divided turntable in the position in which it receives and delivers the mandrels. As shown in Fig. 4, the turntable is adapted for being raised by the part 27, prior to its being rotated to reverse the mandrels.

What I claim is:—

1. In the operation of push-bench drawing apparatus, the method in which the mandrels, after the formation of tubes, are reversed end for end in batches of several together and are subjected in batches to furnace-heat to recondition their metal prior to their re-introduction into the apparatus for use in the formation of other tubes.

2. The combination with push bench apparatus and stripping means to remove a tube from a mandrel of a longitudinally divided turntable for reversing the mandrel, means for feeding a mandrel from the stripping means to one side of the divided turntable and means for simultaneously feeding a mandrel from the other side thereof back to the push bench apparatus.

GAVIN SMELLIE McLAY.